(12) United States Patent
Badaye et al.

(10) Patent No.: US 9,454,268 B2
(45) Date of Patent: *Sep. 27, 2016

(54) FORCE SENSING CAPACITIVE HYBRID TOUCH SENSOR

(75) Inventors: Massoud Badaye, Sunnyvale, CA (US); Greg Landry, Merrimack, NH (US)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/247,590

(22) Filed: Sep. 28, 2011

(65) Prior Publication Data

US 2012/0086666 A1 Apr. 12, 2012

Related U.S. Application Data

(63) Continuation-in-part of application No. 13/091,132, filed on Apr. 21, 2011.

(60) Provisional application No. 61/522,151, filed on Aug. 10, 2011, provisional application No. 61/392,034, filed on Oct. 12, 2010.

(51) Int. Cl.
G06F 3/044 (2006.01)
G06F 3/041 (2006.01)

(52) U.S. Cl.
CPC ............ *G06F 3/044* (2013.01); *G06F 3/0416* (2013.01)

(58) Field of Classification Search
CPC .............................. G06F 3/044; G06F 3/0412
USPC ........................................................ 345/174
See application file for complete search history.

(56) References Cited

U.S. PATENT DOCUMENTS

| 5,149,919 | A | 9/1992 | Greanias et al. |
| 5,543,591 | A * | 8/1996 | Gillespie et al. .......... 178/18.03 |
| 6,492,979 | B1 | 12/2002 | Kent et al. |
| 6,661,239 | B1 | 12/2003 | Ozick |
| 6,940,291 | B1 | 9/2005 | Ozick |
| 7,030,860 | B1 | 4/2006 | Hsu et al. |
| 7,088,346 | B2 | 8/2006 | Krajewski et al. |
| 7,343,813 | B1 * | 3/2008 | Harrington .................... 73/780 |

(Continued)

FOREIGN PATENT DOCUMENTS

| EP | 2214082 A | 8/2010 | |
| WO | WO 2010019004 A2 * | 2/2010 | ............. G06F 3/044 |
| WO | WO 2010019004 A3 * | 7/2010 | |

OTHER PUBLICATIONS

International Search Report and Written Opinion of the International Searching Authority for International Application No. PCT/US11/56019 dated Mar. 7, 2012; 7 pages.

(Continued)

*Primary Examiner* — Temesgh Ghebretinsae
*Assistant Examiner* — Michael J Jansen, II
(74) *Attorney, Agent, or Firm* — Morgan, Lewis & Bockius LLP

(57) ABSTRACT

A method for detecting a magnitude of force applied to a capacitive sensor array may comprise receiving a plurality of capacitance measurements affected by a contact at a touch-sensing surface, and determining a magnitude of a force applied to the touch-sensing surface at a location of the contact based on the location of the contact and a capacitance measurement of the first plurality of capacitance measurements.

19 Claims, 11 Drawing Sheets

(56) References Cited

U.S. PATENT DOCUMENTS

| | | | |
|---|---|---|---|
| 7,911,456 B2 | 3/2011 | Gillespie et al. | |
| 8,125,463 B2* | 2/2012 | Hotelling et al. | 345/173 |
| 8,174,509 B2* | 5/2012 | Liao | G06F 3/044 |
| | | | 345/174 |
| 8,363,031 B2 | 1/2013 | Geaghan | |
| 8,599,165 B2* | 12/2013 | Westhues | G06F 3/0412 |
| | | | 345/174 |
| 8,711,129 B2 | 4/2014 | Hotelling et al. | |
| 2002/0121146 A1* | 9/2002 | Manaresi et al. | 73/862.68 |
| 2003/0067451 A1 | 4/2003 | Tagg et al. | |
| 2004/0160235 A1 | 8/2004 | Okada et al. | |
| 2008/0048997 A1 | 2/2008 | Gillespie et al. | |
| 2008/0088592 A1 | 4/2008 | Fry | |
| 2008/0158175 A1 | 7/2008 | Hotelling et al. | |
| 2008/0180399 A1* | 7/2008 | Cheng | 345/173 |
| 2009/0091551 A1 | 4/2009 | Hotelling et al. | |
| 2009/0273579 A1 | 11/2009 | Zachut et al. | |
| 2010/0066701 A1 | 3/2010 | Ningrat | |
| 2010/0073320 A1 | 3/2010 | Liao et al. | |
| 2010/0073323 A1 | 3/2010 | Geaghan | |
| 2010/0097078 A1 | 4/2010 | Philipp et al. | |
| 2010/0139991 A1 | 6/2010 | Philipp et al. | |
| 2010/0231548 A1 | 9/2010 | Mangione-Smith et al. | |
| 2011/0007021 A1* | 1/2011 | Bernstein et al. | 345/174 |
| 2011/0007023 A1* | 1/2011 | Abrahamsson et al. | 345/174 |
| 2011/0141051 A1* | 6/2011 | Ryu | 345/173 |
| 2011/0273394 A1* | 11/2011 | Young et al. | 345/174 |
| 2012/0038583 A1* | 2/2012 | Westhues et al. | 345/174 |
| 2012/0098783 A1 | 4/2012 | Badaye et al. | |

OTHER PUBLICATIONS

International Search Report and Written Opinion of the International Searching Authority for International Application No. PCT/US11/053638 dated Feb. 17, 2012; 6 pages.

USPTO Advisory Action for U.S. Appl. No. 13/091,132 dated May 1, 2013; 3 pages.

USPTO Advisory Action for U.S. Appl. No. 13/091,132 dated Dec. 26, 2013; 3 pages.

USPTO Final Rejection for U.S. Appl. No. 13/091,132 dated Feb. 13, 2013; 15 pages.

USPTO Final Rejection for U.S. Appl. No. 13/091,132 dated Oct. 18, 2013; 28 pages.

USPTO Non-Final Rejection for U.S. Appl. No. 13/091,132 dated Jan. 30, 2014; 14 pages.

USPTO Non-Final Rejection for U.S. Appl. No. 13/091,132 dated Jul. 3, 2013; 10 pages.

USPTO Non-Final Rejection for U.S. Appl. No. 13/091,132 dated Dec. 12, 2012; 11 pages.

U.S. Appl. No. 13/091,132: "Flexible Capacitive Sensor Array," Massoud Badaye, filed Apr. 21, 2011; 58 pages.

Search Report and Written Opinion of the International Searching Authority for International Application No. PCT/US11/56019 mailed Mar. 7, 2012; 4 pages.

SIPO Office Action for Application No. 201180002806.9 dated Sep. 12, 2015; 6 pages.

USPTO Advisory Action for U.S. Appl. No. 13/091,132 dated Jan. 26, 2015; 9 pages.

USPTO Final Rejection for U.S. Appl. No. 13/091,132 dated May 16, 2014; 17 pages.

USPTO Final Rejection for U.S. Appl. No. 13/091,132 dated Nov. 13, 2014; 20 pages.

USPTO Non-Final Rejection for U.S. Appl. No. 13/091,132 dated Apr. 9, 2015; 19 pages.

USPTO Non-Final Rejection for U.S. Appl. No. 13/091,132 dated Aug. 1, 2014; 18 pages.

Badaye, Office Action, U.S. Appl. No. 13/091,132, Dec. 12, 2012, 11 pgs.

Badayc, Final Office Action, U.S. Appl. No. 13/091,132, Feb. 13, 2013, 15 pgs.

Badaye, Office Action, U.S. Appl. No. 13/091,132, Jul. 3, 2013, 10 pgs.

Badaye, Final Office Action, U.S. Appl. No. 13/091,132, Oct. 18, 2013, 14 pgs.

Badaye, Office Action, U.S. Appl. No. 13/091,132, Jan. 30, 2014, 14 pgs.

Badaye, Final Office Action, U.S. Appl. No. 13/091,132, Nov. 13, 2014, 20 pgs.

Badaye, Final Office Action, U.S. Appl. No. 13/091,132, Jun. 26, 2015, 21 pgs.

* cited by examiner

FORCE SENSING CAPACITIVE HYBRID TOUCH SENSOR

RELATED APPLICATIONS

This application claims priority to U.S. Provisional Application No. 61/522,151, filed on Aug. 10, 2011 and is a continuation in part of U.S. patent application Ser. No. 13/091,132, filed on Apr. 21, 2011, which claims priority to U.S. Provisional Application No. 61/392,034, filed on Oct. 12, 2010, all of which are hereby incorporated by reference.

TECHNICAL FIELD

This disclosure relates to the field of capacitive sensors and, in particular, to a method of measuring force using a capacitive sensor array.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse X/Y movement by using two defined axes which contain a collection of sensor elements that detect the position of one or more conductive objects, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

Another user interface device that has become more common is a touch screen. Touch screens, also known as touchscreens, touch windows, touch panels, or touchscreen panels, are transparent display overlays which are typically either pressure-sensitive (resistive or piezoelectric), electrically-sensitive (capacitive), acoustically-sensitive (surface acoustic wave (SAW)) or photo-sensitive (infra-red). The effect of such overlays allows a display to be used as an input device, removing the keyboard and/or the mouse as the primary input device for interacting with the display's content. Such displays can be attached to computers or, as terminals, to networks. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a single touch, by using a finger to touch the surface of a touch screen, to select an item from a menu.

BRIEF DESCRIPTION OF THE DRAWINGS

The present disclosure is illustrated by way of example, and not by way of limitation, in the figures of the accompanying drawings.

DETAILED DESCRIPTION

Figure 1:
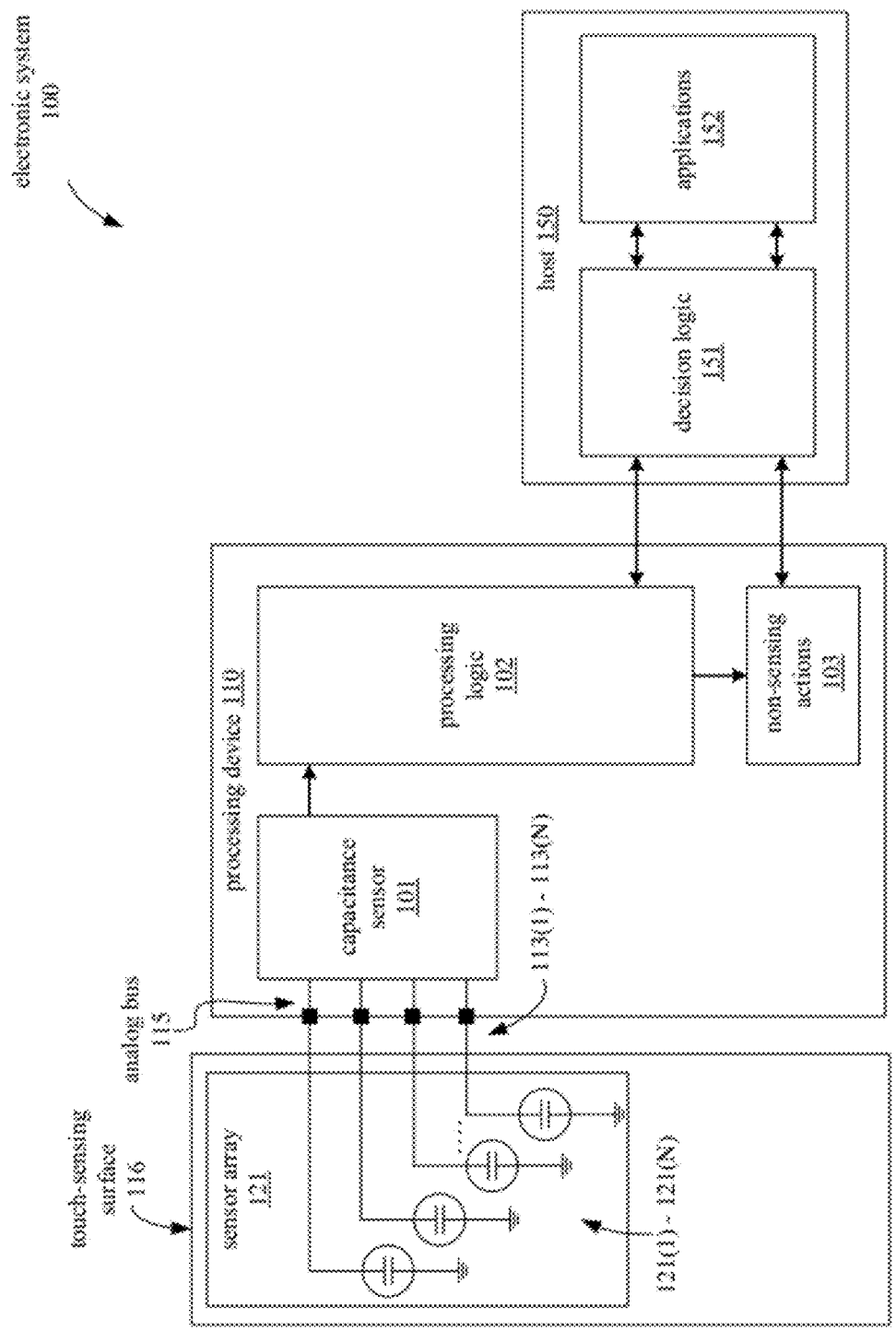
FIG. 1 is a block diagram illustrating an embodiment of an electronic system that processes touch sensor data.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

One embodiment of a flexible touch-sensing surface comprising a capacitive sensor array may be used to determine a magnitude of force applied by a finger or other object to the touch-sensing surface, based on capacitance measurements of the sensor array. Such a touch-sensing surface may further be used to determine an amount of deflection of the sensor at or near a point where the force is applied.

In one embodiment, a flexible touch-sensing surface may include a capacitive sensor array with a highly flexible overlay made of a material such as Poly(methyl methacrylate), or PMMA. In one embodiment, the capacitive sensor array may respond to changes in capacitance resulting from proximity of a conductive object to the capacitive sensor array, or to pressure applied by a conductive or nonconductive object to the surface of the sensor array.

In one embodiment, the flexible touch-sensing surface implemented using a capacitive sensor array may overlay a display panel, such as a liquid crystal display (LCD) screen to implement a touchscreen. In one embodiment, a conductive or nonconductive object applying pressure to the flexible touch-sensing surface may cause displacement of some of the sensor elements of the capacitive sensor array, which may be moved closer to the display panel, thus increasing the capacitive coupling between the display panel and the displaced sensor elements. This displacement may result in measurable changes in capacitance at any sensor elements of the capacitive sensor array that are at least partially displaced.

A processing device implementing the above method may receive the first and second capacitance measurements at a capacitive sensor input, then detect the presence of pressure applied to the touch-sensing surface based on the comparison between the first and second capacitance measurements. In one embodiment, the processing device may further determine a magnitude of force that is applied at the contact, and may transmit the force information to a host for further processing. In one embodiment, the capacitance measurements may be correlated with a force value stored in a lookup table. In one embodiment, the method may be used to determine a force magnitude for each of a plurality of contacts at the touch-sensing surface where force is simultaneously applied.

FIG. 1 illustrates a block diagram of one embodiment of an electronic system 100 including a processing device 110 that may be configured to measure capacitances from a flexible touch-sensing surface and calculate or detect the amount of force applied to the flexible touch-sensing surface. The electronic system 100 includes a touch-sensing surface 116 (e.g., a touchscreen, or a touch pad) coupled to the processing device 110 and a host 150. In one embodiment, the touch-sensing surface 116 is a two-dimensional user interface that uses a sensor array 121 to detect touches on the touch-sensing surface 116.

In one embodiment, the sensor array 121 includes sensor elements 121(1)-121(N) (where N is a positive integer) that are disposed as a two-dimensional matrix (also referred to as an XY matrix). The sensor array 121 is coupled to pins 113(1)-113(N) of the processing device 110 via one or more analog buses 115 transporting multiple signals. In this embodiment, each sensor element 121(1)-121(N) is represented as a capacitor.

In one embodiment, the capacitance sensor 101 may include a relaxation oscillator or other means to convert a capacitance into a measured value. The capacitance sensor 101 may also include a counter or timer to measure the oscillator output. The processing device 110 may further include software components to convert the count value (e.g., capacitance value) into a sensor element detection decision (also referred to as switch detection decision) or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance sensor 101 may be evaluating other measurements to determine the user interaction. For example, in the capacitance sensor 101 having a sigma-delta modulator, the capacitance sensor 101 is evaluating the ratio of pulse widths of the output, instead of the raw counts being over or under a certain threshold.

In one embodiment, the processing device 110 further includes processing logic 102. Operations of the processing logic 102 may be implemented in firmware; alternatively, it may be implemented in hardware or software. The processing logic 102 may receive signals from the capacitance sensor 101, and determine the state of the sensor array 121, such as whether an object (e.g., a finger) is detected on or in proximity to the sensor array 121 (e.g., determining the presence of the object), where the object is detected on the sensor array (e.g., determining the location of the object), tracking the motion of the object, or other information related to an object detected at the touch sensor.

In another embodiment, instead of performing the operations of the processing logic 102 in the processing device 110, the processing device 110 may send the raw data or partially-processed data to the host 150. The host 150, as illustrated in FIG. 1, may include decision logic 151 that performs some or all of the operations of the processing logic 102. Operations of the decision logic 151 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing logic 102 may be implemented in the decision logic 151, the applications 152, or in other hardware, software, and/or firmware external to the processing device 110. In some other embodiments, the processing device 110 is the host 150.

In another embodiment, the processing device 110 may also include a non-sensing actions block 103. This block 103 may be used to process and/or receive/transmit data to and from the host 150. For example, additional components may be implemented to operate with the processing device 110 along with the sensor array 121 (e.g., keyboard, keypad, mouse, trackball, LEDs, displays, or other peripheral devices).

The processing device 110 may reside on a common carrier substrate such as, for example, an integrated circuit (IC) die substrate, or a multi-chip module substrate. Alternatively, the components of the processing device 110 may be one or more separate integrated circuits and/or discrete components. In one embodiment, the processing device 110 may be the Programmable System on a Chip (PSoC™) processing device, developed by Cypress Semiconductor Corporation, San Jose, Calif. Alternatively, the processing device 110 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, the processing device 110 may be a network processor having multiple processors including a core unit and multiple micro-engines. Additionally, the processing device 110 may include any combination of general-purpose processing device(s) and special-purpose processing device(s).

In one embodiment, the electronic system 100 is implemented in a device that includes the touch-sensing surface 116 as the user interface, such as handheld electronics, portable telephones, cellular telephones, notebook computers, personal computers, personal data assistants (PDAs), kiosks, keyboards, televisions, remote controls, monitors, handheld multi-media devices, handheld video players, gaming devices, control panels of a household or industrial appliances, or other computer peripheral or input devices. Alternatively, the electronic system 100 may be used in other types of devices. It should be noted that the components of electronic system 100 may include all the components described above. Alternatively, electronic system 100 may include only some of the components described above, or include additional components not listed herein.

Figure 2:
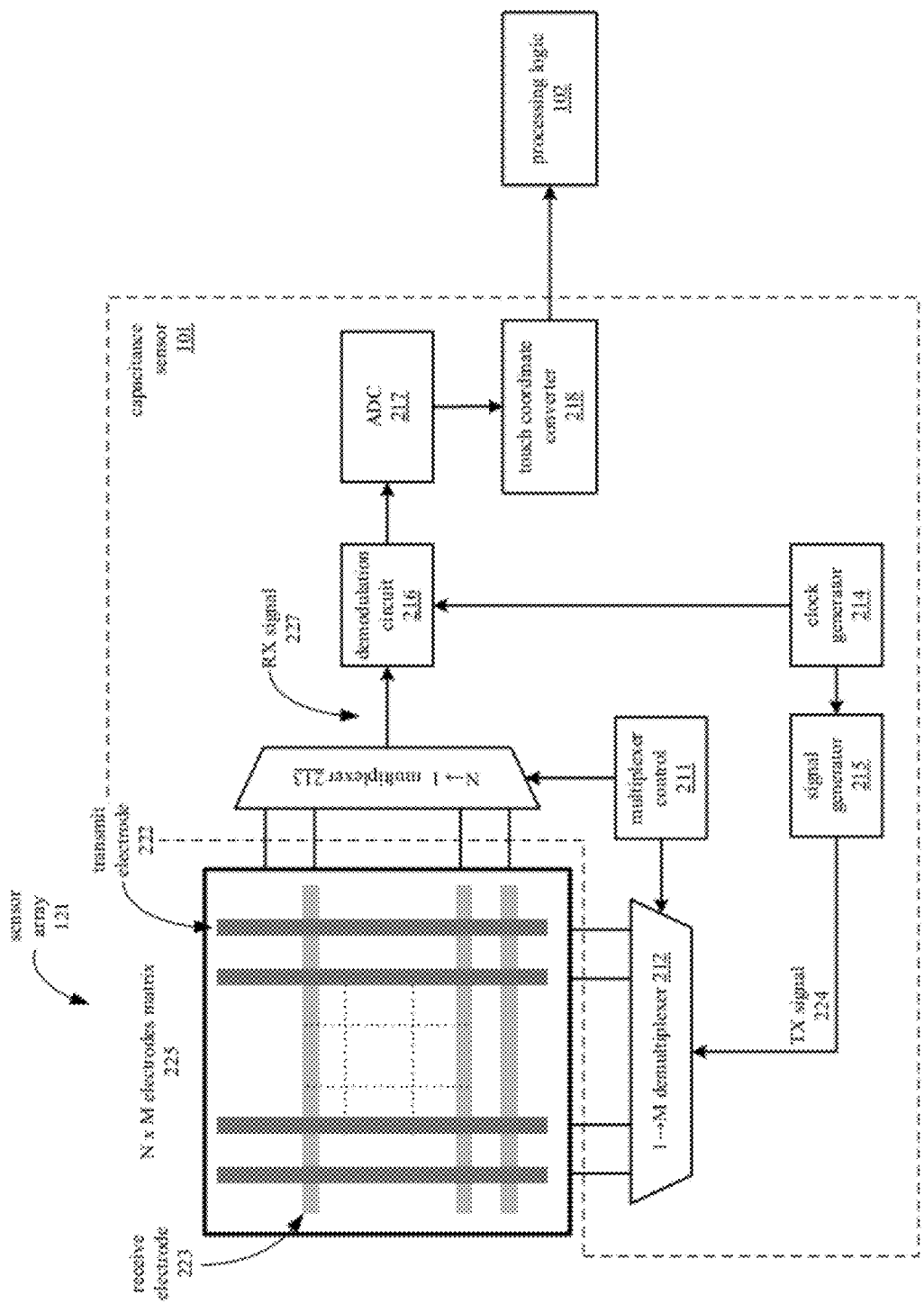
FIG. 2 is a block diagram illustrating an embodiment of an electronic system that processes touch sensor data.

FIG. 2 is a block diagram illustrating one embodiment of a capacitive touch sensor array 121 and a capacitance sensor 101 that converts changes in measured capacitances to coordinates indicating the presence and location of touch. The coordinates are calculated based on changes in measured capacitances relative to the capacitances of the same touch sensor array 121 in an un-touched state. In one embodiment, sensor array 121 and capacitance sensor 101 are implemented in a system such as electronic system 100. Sensor array 121 includes a matrix 225 of N×M electrodes (N receive electrodes and M transmit electrodes), which further includes transmit (TX) electrode 222 and receive (RX) electrode 223. Each of the electrodes in matrix 225 is connected with capacitance sensing circuit 101 through demultiplexer 212 and multiplexer 213.

Capacitance sensor 101 includes multiplexer control 211, demultiplexer 212 and multiplexer 213, clock generator 214, signal generator 215, demodulation circuit 216, and analog to digital converter (ADC) 217. ADC 217 is further coupled with touch coordinate converter 218. Touch coordinate converter 218 may be implemented in the processing logic 102.

The transmit and receive electrodes in the electrode matrix 225 may be arranged so that each of the transmit electrodes overlap and cross each of the receive electrodes such as to form an array of intersections, while maintaining galvanic isolation from each other. Thus, each transmit electrode may be capacitively coupled with each of the receive electrodes. For example, transmit electrode 222 is capacitively coupled with receive electrode 223 at the point where transmit electrode 222 and receive electrode 223 overlap.

Clock generator 214 supplies a clock signal to signal generator 215, which produces a TX signal 224 to be supplied to the transmit electrodes of touch sensor 121. In one embodiment, the signal generator 215 includes a set of switches that operate according to the clock signal from clock generator 214. The switches may generate a TX signal 224 by periodically connecting the output of signal generator 215 to a first voltage and then to a second voltage, wherein said first and second voltages are different.

The output of signal generator 215 is connected with demultiplexer 212, which allows the TX signal 224 to be applied to any of the M transmit electrodes of touch sensor 121. In one embodiment, multiplexer control 211 controls demultiplexer 212 so that the TX signal 224 is applied to each transmit electrode 222 in a controlled sequence. Demultiplexer 212 may also be used to ground, float, or connect an alternate signal to the other transmit electrodes to which the TX signal 224 is not currently being applied. In an alternate embodiment the TX signal 224 may be presented in a true form to a subset of the transmit electrodes 222 and in complement form to a second subset of the transmit electrodes 222, wherein there is no overlap in members of the first and second subset of transmit electrodes 222.

Because of the capacitive coupling between the transmit and receive electrodes, the TX signal 224 applied to each transmit electrode induces a current within each of the receive electrodes. For instance, when the TX signal 224 is applied to transmit electrode 222 through demultiplexer 212, the TX signal 224 induces an RX signal 227 on the receive electrodes in matrix 225. The RX signal 227 on each of the receive electrodes can then be measured in sequence by using multiplexer 213 to connect each of the N receive electrodes to demodulation circuit 216 in sequence.

The mutual capacitance associated with each intersection between a TX electrode and an RX electrode can be sensed by selecting every available combination of TX electrode and an RX electrode using demultiplexer 212 and multiplexer 213. To improve performance, multiplexer 213 may also be segmented to allow more than one of the receive electrodes in matrix 225 to be routed to additional demodulation circuits 216. In an optimized configuration, wherein there is a 1-to-1 correspondence of instances of demodulation circuit 216 with receive electrodes, multiplexer 213 may not be present in the system.

When a conductive object, such as a finger, approaches the electrode matrix 225, the object causes a decrease in the measured mutual capacitance between only some of the electrodes. For example, if a finger is placed near the intersection of transmit electrode 222 and receive electrode 223, the presence of the finger will decrease the charge coupled between electrodes 222 and 223. Thus, the location of the finger on the touchpad can be determined by identifying the one or more receive electrodes having a decrease in measured mutual capacitance in addition to identifying the transmit electrode to which the TX signal 224 was applied at the time the decrease in capacitance was measured on the one or more receive electrodes.

By determining the mutual capacitances associated with each intersection of electrodes in the matrix 225, the presence and locations of one or more conductive objects may be determined. The determination may be sequential, in parallel, or may occur more frequently at commonly used electrodes.

In alternative embodiments, other methods for detecting the presence of a finger or other conductive object may be used where the finger or conductive object causes an increase in measured capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined based on the locations of one or more electrodes at which a change in measured capacitance is detected.

The induced current signal 227 is integrated by demodulation circuit 216. The rectified current output by demodulation circuit 216 can then be filtered and converted to a digital code by ADC 217.

A series of such digital codes measured from adjacent sensor or intersections may be converted to touch coordinates indicating a position of an input on touch sensor array 121 by touch coordinate converter 218. The touch coordinates may then be used to detect gestures or perform other functions by the processing logic 102.

In one embodiment, the capacitance sensor 101 can be configured to detect multiple touches. One technique for the detection and location resolution of multiple touches uses a two-axis implementation: one axis to support rows and another axis to support columns. Additional axes, such as a diagonal axis, implemented on the surface using additional layers, can allow resolution of additional touches.

In one embodiment, a system for tracking locations of contacts on a touch-sensing surface may determine a force magnitude for each of the contacts based on the capacitance measurements from the capacitive sensor array. In one embodiment, a capacitive touch-sensing system that is also capable of determining a magnitude of force applied to each of a plurality of contacts at a touch-sensing surface may be constructed from flexible materials, such as PMMA, and may have no shield between the capacitive sensor array and an LCD display panel. In such an embodiment, changes in capacitances of sensor elements may be caused by the displacement of the sensor elements closer to a VCOM plane of the LCD display panel.

Figure 3A:
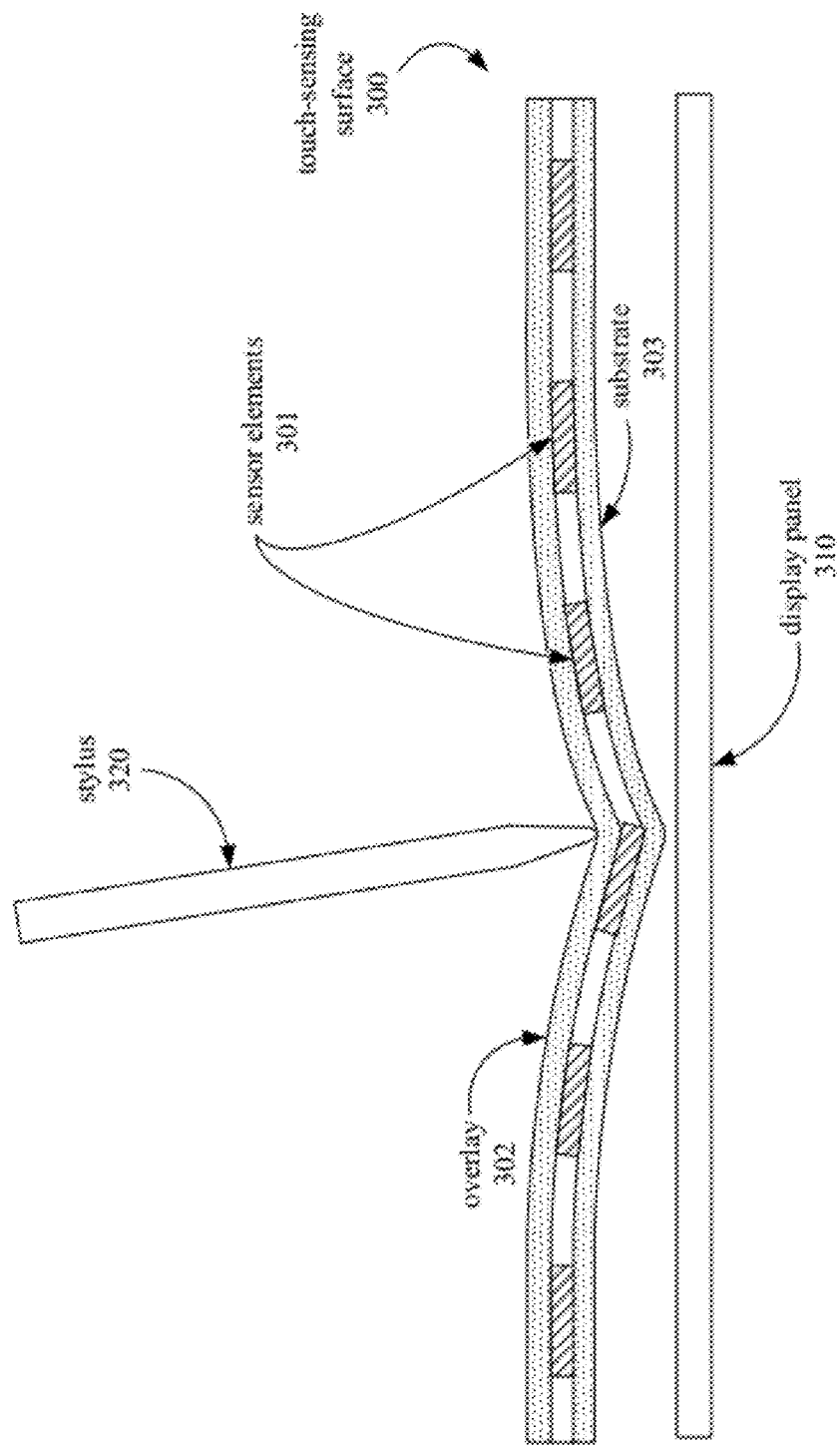
FIG. 3A illustrates a profile view of a flexible touch-sensing surface, according to an embodiment.
Figure 3B:
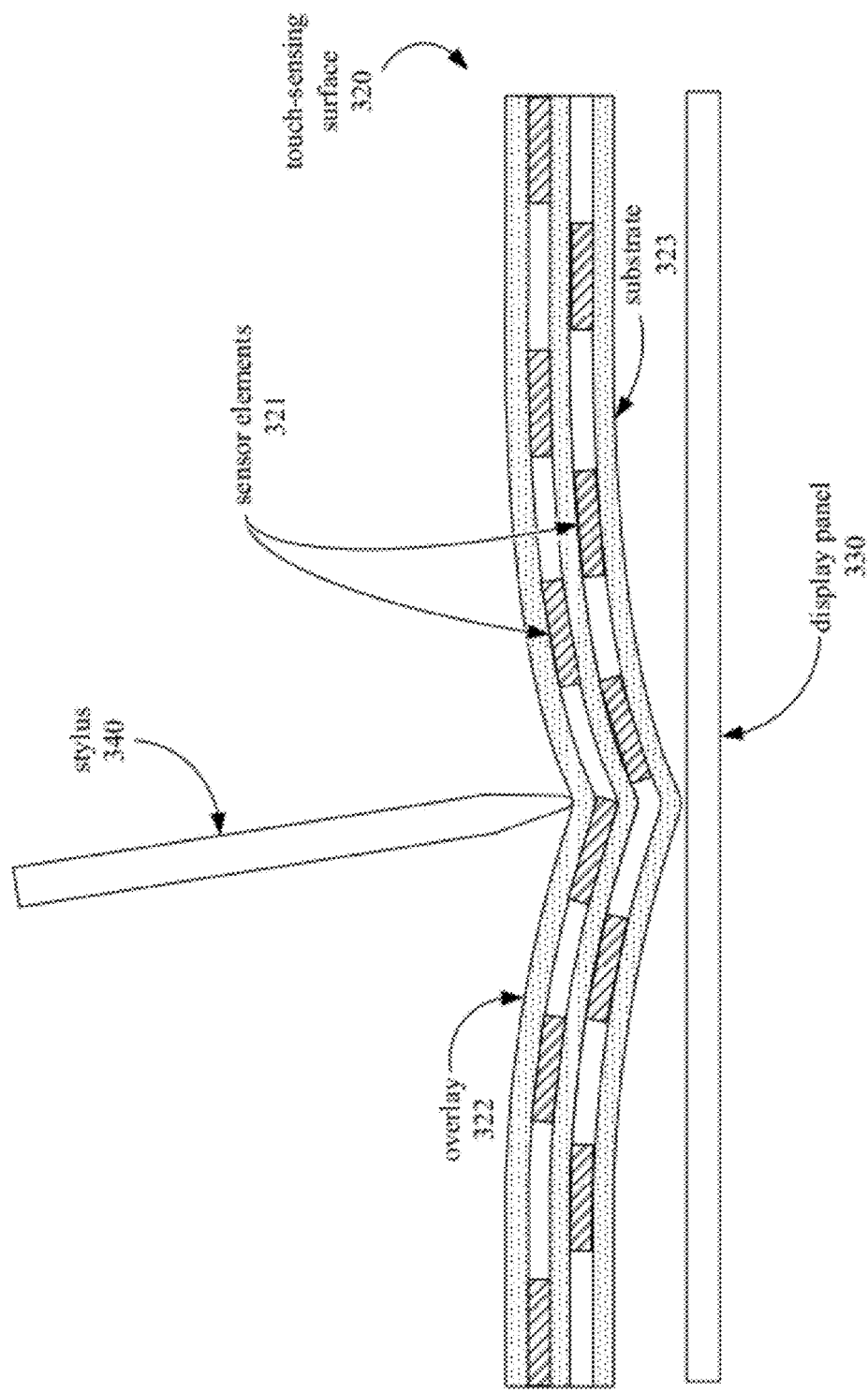
FIG. 3B illustrates a profile view of a dual layer flexible touch-sensing surface, according to an embodiment.

FIGS. 3A and 3B illustrate embodiments of flexible touch-sensing surfaces that may be connected to a capacitance sensor such as capacitance sensor 101. Touch-sensing surface 300, as illustrated in FIG. 3A, includes a number of sensor elements 301 that may be part of a capacitive sensor array such as sensor array 121, as illustrated in FIG. 2.

Touch-sensing surface 300 includes the sensor elements 301 formed on a substrate 303 and covered by an overlay 302. In one embodiment, the substrate 303 is made from a material such as Polyethylene terephthalate (PET). In one embodiment, the substrate 303 is flexible and transparent. The layer of sensor elements 301 may be additionally covered with an overlay 302, which may be manufactured from a material such as PMMA. In one embodiment, the overlay 302 is also flexible and transparent. The flexible touch-sensing surface 300 overlays a display panel 310, which may be a LCD display, LED display, OLED display, or some other type of display panel.

As illustrated in FIG. 3A, pressure may be applied to the touch-sensing surface 300 by an object such as stylus 320. The pressure applied by the stylus 320 displaces the sensor elements 301 such that sensor elements nearer to the location where the pressure is applied are pushed closer to the display panel.

Touch-sensing surface 320, as illustrated in FIG. 3B, is similar to touch-sensing surface 310, but includes multiple layers of sensor elements 321. Touch-sensing surface 320 overlays a display panel 330, and includes two layers of sensor elements 321 formed on a substrate 323 and covered by an overlay 322. Stylus 340 applies pressure to the flexible touch-sensing surface, deforming the surface and moving at least a portion of some sensor elements closer to the display panel 330.

As illustrated in FIGS. 3A and 3B, the displacement of the sensor elements is exaggerated for clarity. In the following description, the terms "force" and "pressure" may be used interchangeably to describe a condition that causes displacement of sensor elements or deformation of the touch-sensing surface or sensor array.

Because of the deflection of the sensor elements 301 and 321 closer to the LCD, the capacitive coupling between the electrodes and the LCD increases. Thus, even a displacement of the sensor elements by a non-conductive stylus or object can cause a change in the measured capacitances as compared to the baseline capacitance values, which are the capacitance values measured from the sensor elements when the sensor elements are not displaced. In one embodiment, the baseline capacitance tracks changes due to fluctuations in temperature or other factors to minimize the effect of these factors on the measured capacitance.

A subset of the capacitance measurements that are changed by the displacement of the sensor elements can be used to detect and measure the force applied to the capacitive sensor array. The deflection of some of the sensor elements 301 or 321 can result in an increase in the signal strengths measured by an ADC such as ADC 217.

Figure 4A:
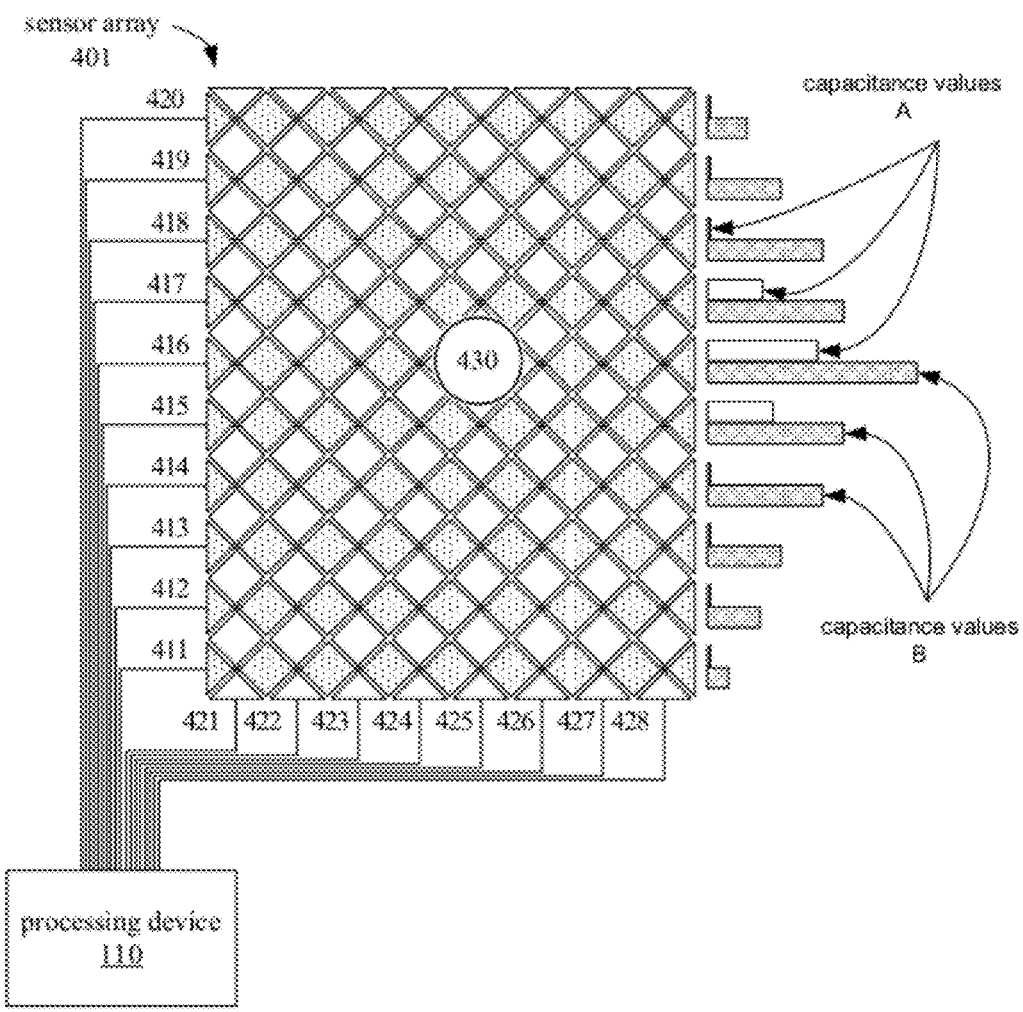
FIG. 4A illustrates an embodiment of a capacitive sensor array.

FIG. 4A illustrates a sensor array 401 of a flexible touch-sensing surface that includes row sensor elements 411-420 and column sensor elements 421-428. The row and column sensor elements 411-428 are connected to a processing device 110, which measures capacitance values from each of the sensor elements 411-428.

In one embodiment, the capacitance values A (unshaded bars) represent capacitance values measured from the row sensor elements 411-420 when a contact 430 by a conductive object is near or touching the sensor array 401, but is not exerting force on the sensor array 401 and is not deforming sensor array 401. Capacitance values B (shaded bars) represent capacitance values measured from the row sensor elements 411-420 when the conductive object additionally exerts a force deforming the sensor array at contact location 430. Individual capacitance values from sets A and B are referenced according to the sensor elements from which they are measured, i.e., capacitance measurement 416A or 416B from row element 416. The sets A and B can each be referred to as a capacitance profile associated with a particular set of contacts at the touch-sensing surface.

In one embodiment, if a non-conductive object applies force to the sensor array 401 at a high speed, the first few profiles may have profile ratios that are comparable to those that may be caused by a conductive contact that does not apply force. This may cause difficulty in distinguishing between the conductive and non-conductive contacts. To resolve this problem, a debouncing technique may be implemented so that a number of initial sampled profiles may be discarded. For example, the first one or two profiles sampled after detecting the initial contact may be discarded so that the touching object settles to its normal profile.

In FIG. 4A, the set of capacitance values A illustrates that a contact 430 that does not apply force to the sensor array 401 and does not displace the sensor elements 411-428 results in a sharper drop in magnitude of the capacitance signal farther away from the center of contact 430. In contrast, the set of capacitance values B resulting from an object applying force to the sensor array 401 at contact 430 illustrates a more gradual drop in magnitude of the capacitance signals farther from the center of contact 430, which is caused by the displacement of the sensor elements near the contact 430.

Thus, in one embodiment, a contact 430 from a conductive object not applying force results in a sharper profile. In contrast, the contact 430 from an object applying force and deforming the sensor array results in a wider, flatter profile. In some cases, even a nonconductive object applying force at contact location 430 may sufficiently increase the capacitance signals B such that the touch-sensing system may interpret the contact as a touch by a conductive object.

In one embodiment, a processing device such as processing device 110 that is connected to a capacitive sensor array 401 may detect deformation caused by pressure on the sensor array 401 based on a comparison between a first capacitance measurement and a second capacitance measurement from the set of capacitance measurements taken from the row elements (or column elements) of sensor array 401. In one embodiment, the capacitance measurement with the highest magnitude may be selected as the first capacitance value, while the second capacitance value may be chosen the nth strongest capacitance signal, where n is a predetermined integer. Alternatively, the second capacitance value may be measured from a sensor element that is a predetermined distance from the first capacitance value. For example, a first capacitance value 416A may be compared with a second value 419A.

In one embodiment, a profile ratio between the first and second capacitance values may be calculated, and an amount of force applied to the sensor elements or an amount of sensor deformation or displacement of the sensor elements may be inferred based on the profile ratio. For example, a profile ratio below a specific profile ratio threshold may be used to indicate that force is being applied to the sensor array 401, and may trigger a process to calculate the magnitude of the force applied to the flexible touch-sensing surface. In one embodiment, the calculation may be performed by the processing device 110.

In one embodiment, the calculation process of the magnitude of the force allows detecting gestures based on how much force is applied to the flexible touch-sensing surface. Since deformation of the sensor array resulting from force applied by a non-conductive object causes a wider profile (smaller drop-off farther from the contact) when compared to a narrow profile (larger drop-off farther from the contact) caused by a conductive object, a shape of the profile may be used to distinguish the cases.

For example, a ratio that characterizes the shape of the profile may be calculated using Equation 1 below:

$$\text{profile\_ratio} = \frac{Cpeak}{Cn} \qquad \text{(Equation 1)}$$

In one embodiment, Cpeak is the first capacitance value, having the highest magnitude, while Cn is the second capacitance value, which is chosen such that Cn is the nth strongest signal. For example, for n=4, and when signal 416A is the first capacitance value Cpeak, signal 418A may be chosen as the second capacitance value Cn, since 418A is the $4^{th}$ strongest capacitance value. Alternatively, Cn may be a capacitance signal corresponding to a sensor element n elements away from the sensor element corresponding to the first capacitance value. For example, for n=4, and while 416A is chosen as the first capacitance value Cpeak, 412A or 420A may be chosen as the second capacitive value Cn.

Figure 4B:
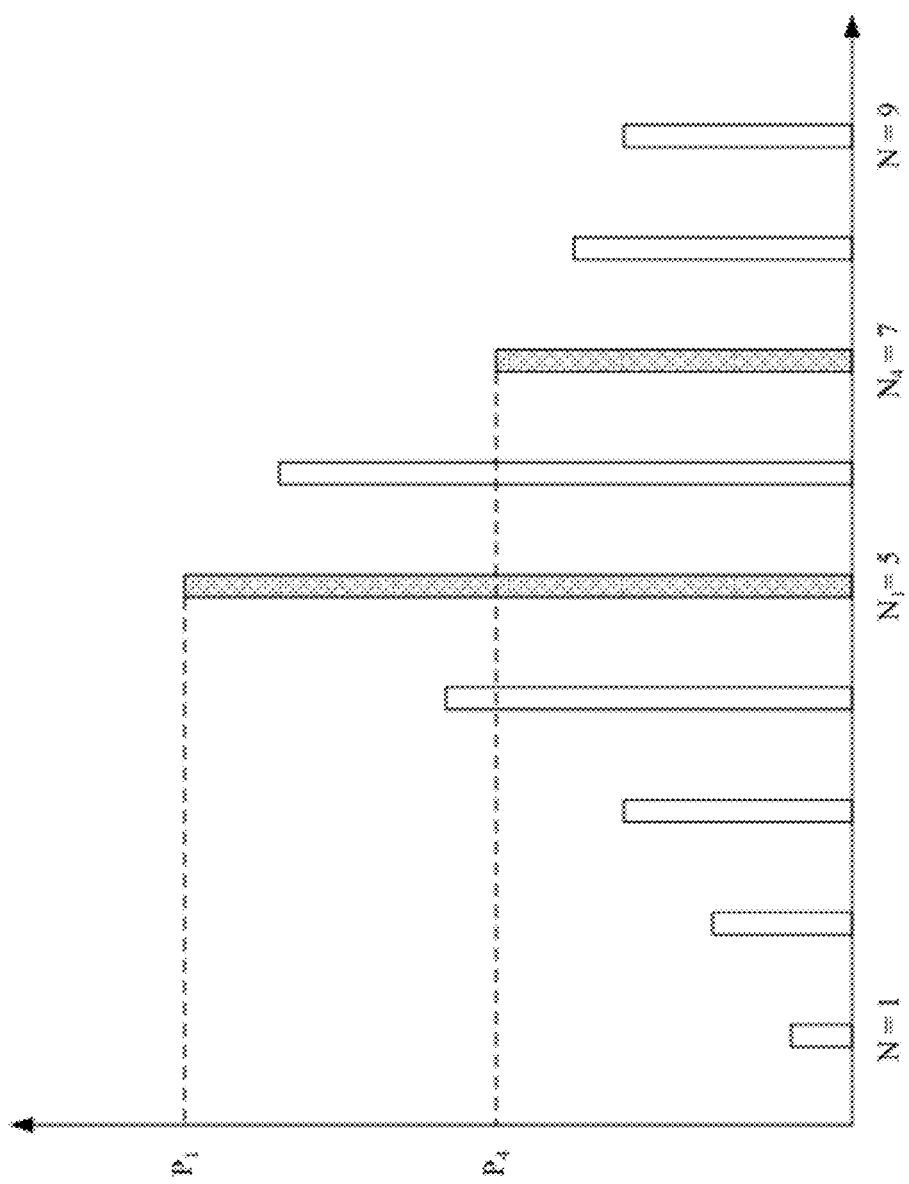
FIG. 4B illustrates a capacitance profile of a capacitive sensor array, according to an embodiment.

FIG. 4B illustrates a capacitance profile according to an embodiment. The capacitance profile illustrated in FIG. 4B includes a series of capacitance measurements for N=1 to N=9. Since the capacitance measurement for N=5 has the highest value, the N=5 measurement is designated as $P_1$. Accordingly, the fourth largest value, corresponding to N=7, is designated $P_4$. In one embodiment, $P_1$ and $P_4$ may be used as the first and second capacitance values Cpeak and Cn.

In one embodiment, the value for n may be chosen such that a capacitance value that is affected by the sensor element displacement, and that is less affected by proximity of a conductive object is chosen as the second capacitance value. The value for n may be determined empirically by comparing profiles caused by conductive contacts and non-conductive contacts that apply force. The value of n may also differ based on the pitch of the sensor elements in sensor array 401.

One embodiment of a touch-sensing system that is capable of detecting force may correlate values for a fourth strongest signal ($P_4$), peak signal ($P_1$), and deflection (D) with a force value and a location on the touch-sensing surface. In one embodiment, these values may be stored in a table such as 3D lookup table 600, illustrated in FIG. 5.

The 3D lookup table 600 includes 16 sets of ($P_4$, $P_1$, D) values such as value set 602 for each layer 601. Each layer of 3D lookup table 600 represents an amount of force that may be applied to the touch-sensing surface. For example, when determining the values in the lookup table 600 empirically, each of the values in the same layer may have been determined by applying the same amount of force to the touch-sensing surface.

In one embodiment, a table such as the 3D lookup table 600 may be generated by a robot that applies a target force to various locations on the touch-sensing surface using a touching object, while utilizing a force gauge to control and measure the amount of force applied to the surface by the touching object. The Z-position of the touching object at the time the target force is applied or measured can be used to estimate the amount of sensor deflection.

In one embodiment, the 16 ($P_4$, $P_1$, D) value sets may correspond to intersections in the sensor array. Alternatively, the value sets may only be stored for some intersections of sensor elements, or may be stored for other points distributed across the surface of the sensor array that are not associated with an intersection. In one embodiment, fewer or more than 16 value pairs are stored in each layer. A 3D lookup table may also include fewer or more than 3 layers.

In one embodiment, the peak ($P_1$) and fourth strongest ($P_4$) capacitance values may be used to correct for shifting of any detected coordinate locations of contacts due to displacement of sensor elements by force applied to the touch-sensing surface. For example, a touch by a conductive object that displaces sensor elements may result in a different set of reported coordinates as compared to a touch in the same location that does not displace the sensor elements.

In one embodiment, in addition to correcting for coordinate shifting effects, the $P_4$ value of a contact may also be used to determine a magnitude of a force applied to the touch-sensing surface at the contact location. In one embodiment, the $P_4$ value represents a signal that is affected primarily by the force applied to the contact location or the displacement of the sensor elements, and is less affected by capacitive coupling with the object contacting the touch-sensing surface. In one embodiment, $P_4$ may be replaced by any capacitance signal that is attributable primarily to force applied to the surface or displacement of the sensor elements, rather than capacitive coupling with a finger or other conductive object.

In one embodiment, the value of $P_4$ changes monotonically with the amount of force applied to the touch-sensing surface. Thus, the applied force may be represented as a function of $P_4$ for each of the 16 value pairs (which may correspond to locations on the touch-sensing surface). The lookup table may then be used to determine the force on the sensor based on a measured $P_4$ value. In one embodiment, determining the magnitude of the applied force based on the $P_4$ value may occur in real time, during the operation of the touch-sensing system.

Figure 5:
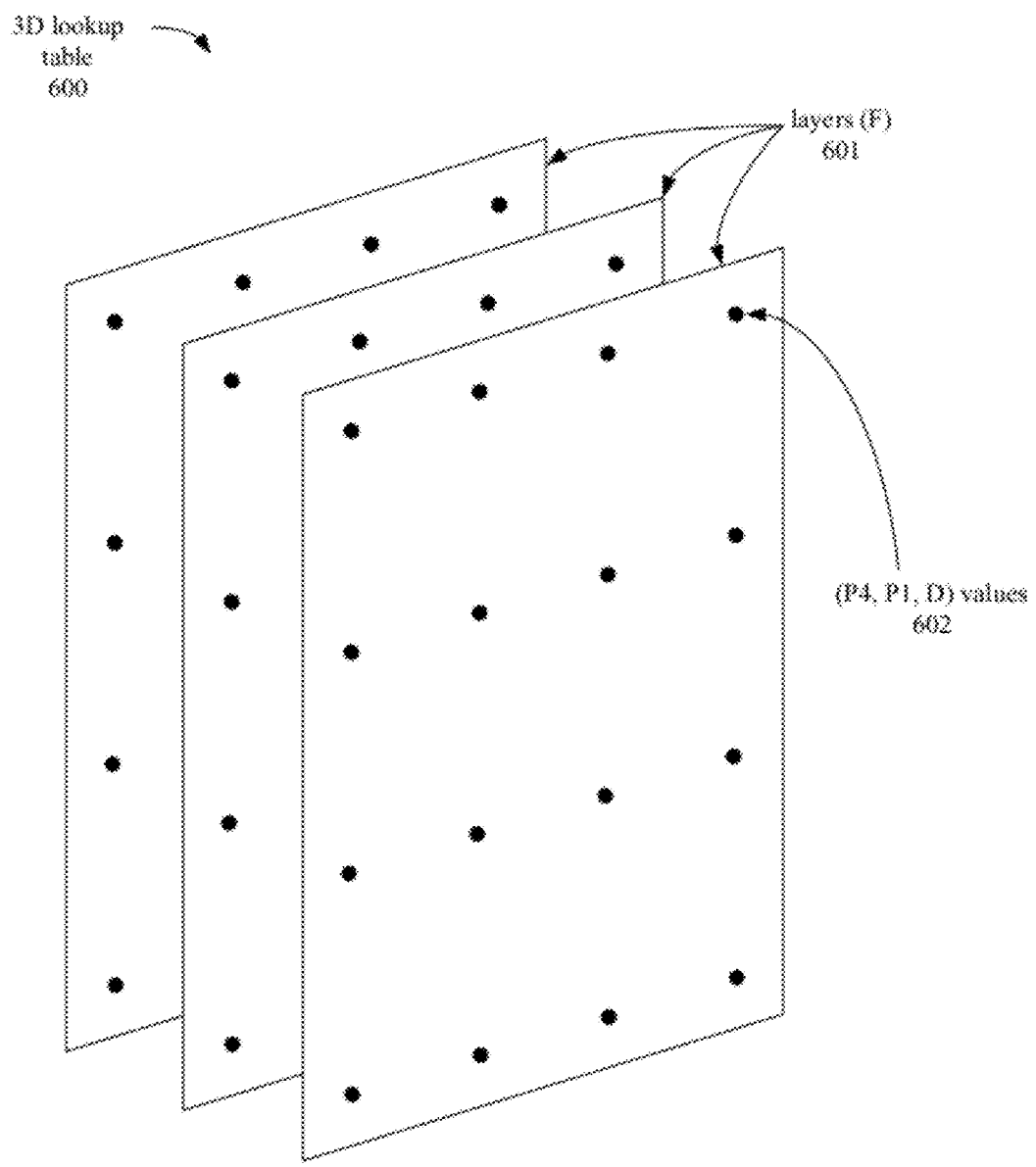
FIG. 5 illustrates a three-dimensional (3D) lookup table, according to an embodiment.

In one embodiment, a touch-sensing system implementing a process for detecting force applied to a touch-sensing surface may capture a capacitance profile caused by one or more contacts at the touch-sensing surface, then use the $P_1$ and $P_4$ values stored in a lookup table to correct the capacitance profile and obtain a corrected coordinate location for each of the one or more contacts. For example, the touch-sensing system may determine an appropriate quadratic compensation profile to adjust the measured capacitance profile, then determine a touch location based on the compensated profile. Using a 3D lookup table such as table 600, as illustrated in FIG. 5, the touch-sensing system may further use linear interpolation to determine $P_4$ values corresponding to the touch location for each force layer 601. In one embodiment, the measured $P_4$ value may lie between two interpolated $P_4$ values corresponding to two force levels F1 and F2. The touch-sensing system may perform further interpolation between the force layers F1 and F2 to more accurately correlate the measured $P_4$ with a force value.

Figure 6:
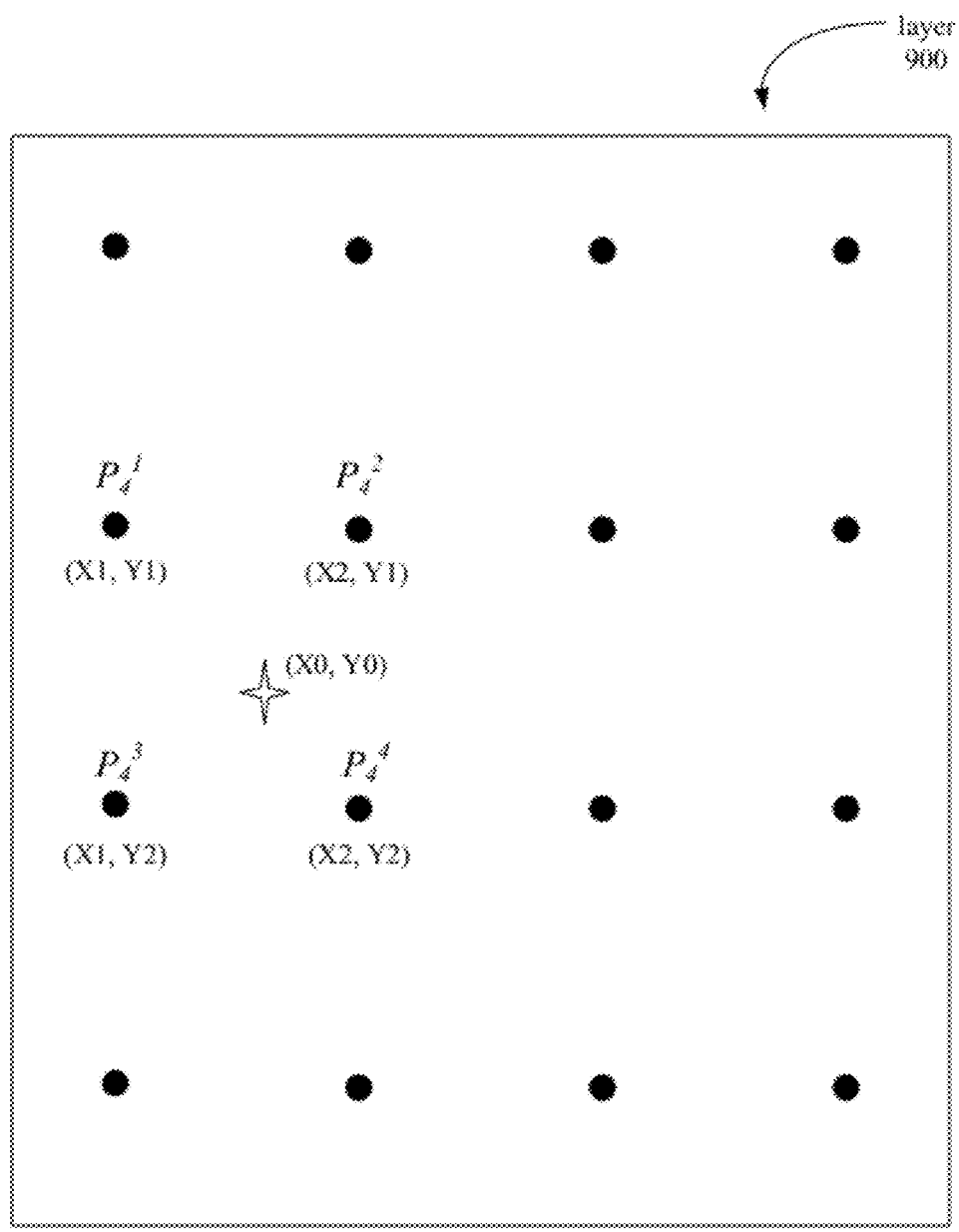
FIG. 6 illustrates a layer of a 3D lookup table, according to an embodiment.

FIG. 6 illustrates one force layer 900 of a 3D lookup table, such as table 600, according to an embodiment. Each of the 16 points in layer 900 is associated with an X/Y coordinate location, which may correspond to a location on a touch-sensing surface. The location (X0, Y0) may indicate a location of a contact at the touch-sensing surface by an object applying force to the touch-sensing surface.

As illustrated in FIG. 6, the touch location (X0, Y0) is surrounded by four points: (X1, Y1), (X2, Y1), (X1, Y2), and (X2, Y2). In one embodiment, a contact at location (X0, Y0) causes a $P_4$ signal that is a weighted average of the $P_4$ values of the four surrounding points. In one embodiment, the weighting factors may be determined by the distance from the touch location (X0, Y0) to each of the four surrounding points. Defining the weighting factors in the X and Y directions as $\alpha$, and $\beta$, respectively, yields Equations 2 and 3 below:

$$\alpha = \frac{X0 - X1}{X2 - X1} \quad \text{(Equation 2)}$$

$$\beta = \frac{Y0 - Y1}{Y2 - Y1} \quad \text{(Equation 3)}$$

The interpolated $P_4$ value at the touch location (X0, Y0) may thus be represented as Equation 4:

$$P0 = (1-\beta)[(1-\alpha)P_4^1 + \alpha P_4^3] + \beta[(1-\alpha)P_4^2 + \alpha P_4^4] \quad \text{(Equation 4)}$$

In one embodiment, the $P_4$ values $P_4^1$, $P_4^2$, $P_4^3$, and $P_4^4$, associated with the four surrounding points may have different values depending on the force applied to the contact. Thus, if the force being applied to the touch-sensing surface is not equal to any of the force values associated with a force layer 601, the $P_4$ value calculated by interpolation between the four surrounding points will have some error. For a more accurate estimate of the measured $P_4$ value, the touch-sensing system may perform the above interpolation between the four surrounding points for all force layers 601, and may then find the closest pair of interpolated $P_4$ values (denoted by $P_{4,1}^0$ and $P_{4,2}^0$) such that $P_{4,2}^0 > P_4$(measured) $> P_{4,1}^0$. In one embodiment, each of $P_{4,1}^0$ and $P_{4,2}^0$ may be associated with the same X,Y coordinate location as the contact location being measured, and may be associated with adjacent force layers.

Figure 7:
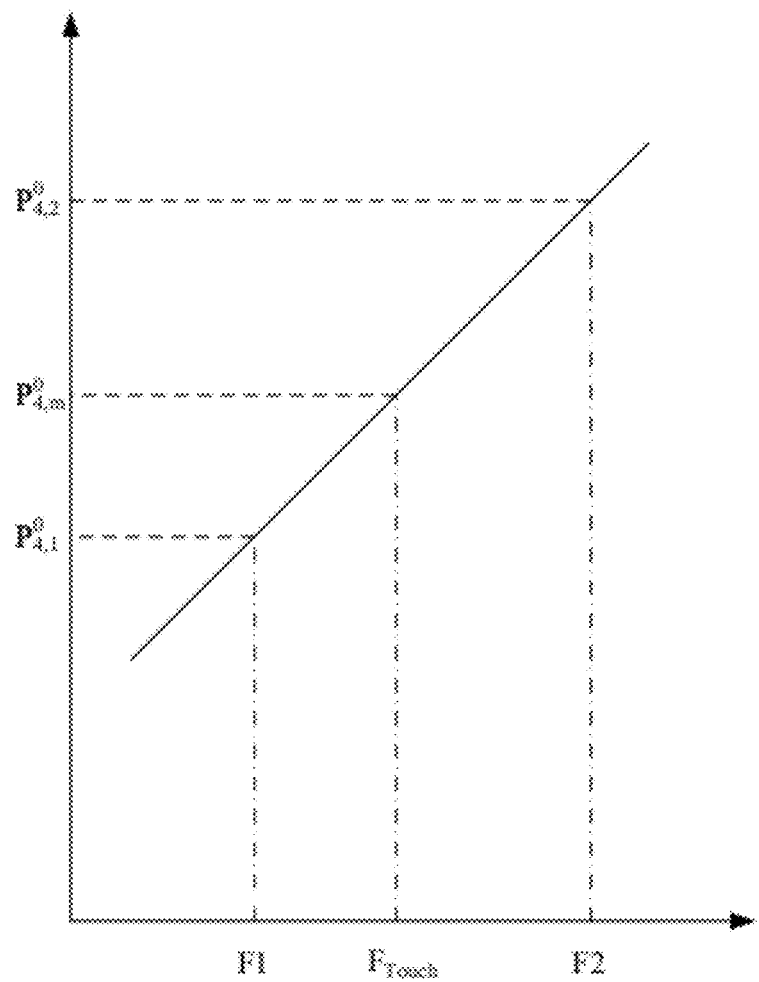
FIG. 7 is a graph illustrating interpolation between layers of a 3D correction table, according to an embodiment.

FIG. 7 illustrates the interpolation between force layers, according to one embodiment. The values $P_{4,1}^0$ and $P_{4,2}^0$ are the $P_4$ values for adjacent force layers F1 and F2, respectively. The actual force applied to the contact ($F_{Touch}$) results in a measured P4 value of $P_{4,m}^0$. $F_{Touch}$ is between the force layers F1 and F2; accordingly, $F2 > F_{Touch} > F1$. A more accurate estimate of the actual force $F_{Touch}$ applied to the touch-sensing surface may be determined by linear interpolation between F1 and F2. Defining a weighting factor $\gamma$ yields Equation below:

$$\gamma = \frac{P_{4,m}^0 - P_{4,1}^0}{P_{4,2}^0 - P_{4,1}^0} \quad \text{(Equation 5)}$$

Thus, the interpolated force applied to the contact location is determined by Equation 5:

$$F_{Touch} = (1-\gamma)F1 + \gamma F2 \quad \text{(Equation 6)}$$

In one embodiment, Equation 6 is valid for interpolation between two force layers; however, if the estimated $P_4$ value results from an applied force that is greater than the largest recorded force or less than the smallest recorded force in the force layers, then extrapolation may be used instead. In one embodiment, the extrapolation may be based on assuming a linear relationship between the force value and the $P_4$ value.

For example, Equation 6 above expresses a linear relationship between the force value and the $P_4$ value. Equation 6 may be expressed in the form of Equation 7 below:

$$F_{Touch} = \frac{(F2 - F1)}{P_{4,2}^0 - P_{4,1}^0} P_4 + \frac{P_{4,2}^0 F1 - P_{4,1}^0 F2}{P_{4,2}^0 - P_{4,1}^0} \quad \text{(Equation 7)}$$

Figure 8:
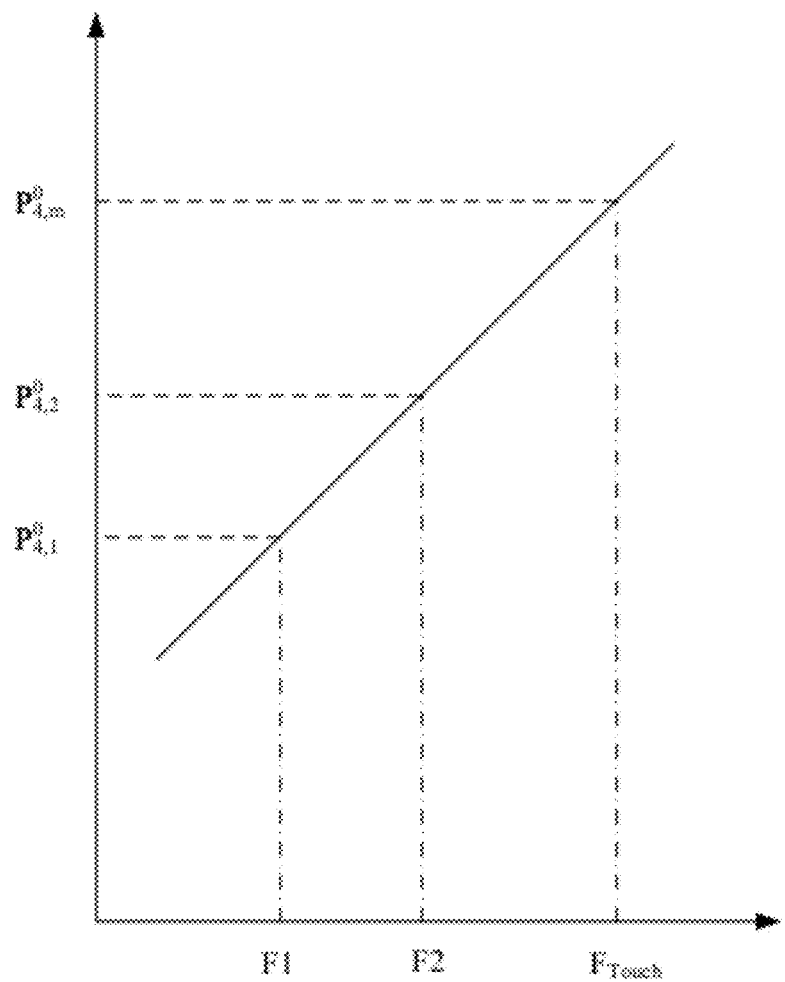
FIG. 8 is a graph illustrating extrapolation based on layers of a 3D correction table, according to an embodiment.

Equation 7 expresses a linear relationship between $F_{Touch}$ and $P_4$. In one embodiment, extrapolation may be used to find $F_{Touch}$ if the estimated value for $P_4$ is greater than the $P_4$ value corresponding to the largest stored force in the table. FIG. 8 illustrates the determination of $F_{Touch}$ using extrapolation based on the largest force F2, having a corresponding $P_4$ value of $P_{4,2}^0$, and the next force level below F2, designated as F1 and having a corresponding $P_4$ value of $P_{4,1}^0$. Assuming that the linear relationship between the force and $P_4$ values extends beyond F2 yields Equation 8 below:

$$F_{Touch} = \frac{(F2 - F1)}{P_{4,2}^0 - P_{4,1}^0} P_{4,m}^0 + \frac{P_{4,2}^0 F1 - P_{4,1}^0 F2}{P_{4,2}^0 - P_{4,1}^0} \quad \text{(Equation 8)}$$

In Equation 8, $P_{4,m}^0$ represents the $P_4$ value measured from the capacitive touch-sensor array, which corresponds to a force value $F_{Touch}$ that is larger than the largest force value F2.

In one embodiment, each of multiple contacts at the touch sensing surface may create its own independent capacitance profile, such that a force applied at each of the multiple contacts may be independently determined according to the above methods. Thus, a touch-sensing system implementing these force detection methods may, after determining a force applied at a first contact based on the capacitance measurements, further determine a magnitude of a second force applied simultaneously with the first force at a second contact location based on a second set of capacitance measurements, including a peak capacitance value and a $P_4$ value. In one embodiment, the touch-sensing system may determine the force applied to the second contact in a similar manner as for the force applied to the first contact.

In one embodiment, the deflection induced capacitance profiles may also be used to report locations of one or more simultaneous contacts at the touch-sensing surface by either conductive or non-conductive objects.

In one embodiment, the above method for determining a force applied to a contact at a touch-sensing surface may be used to determine an amount of displacement, or deflection, of a portion of the touch-sensing surface. For example, an object contacting a touch-sensing surface and applying force to the contact location may cause the part of the touch-sensing surface at which the force is applied to be displaced. In one embodiment, a displacement may be represented as a distance along an axis perpendicular to the touch-sensing surface.

In one embodiment, a displacement value representing the amount of displacement caused by a force applied to a touch-sensing surface may be stored in a 3D lookup table, such as table 600, as illustrated in FIG. 5. In one embodiment the displacement values may be determined empirically by applying a known force to the touch-sensing surface, then measuring the resulting displacement and storing the displacement value for each of a number of locations. The displacement value can then be determined in a similar manner as the force.

Figure 9:
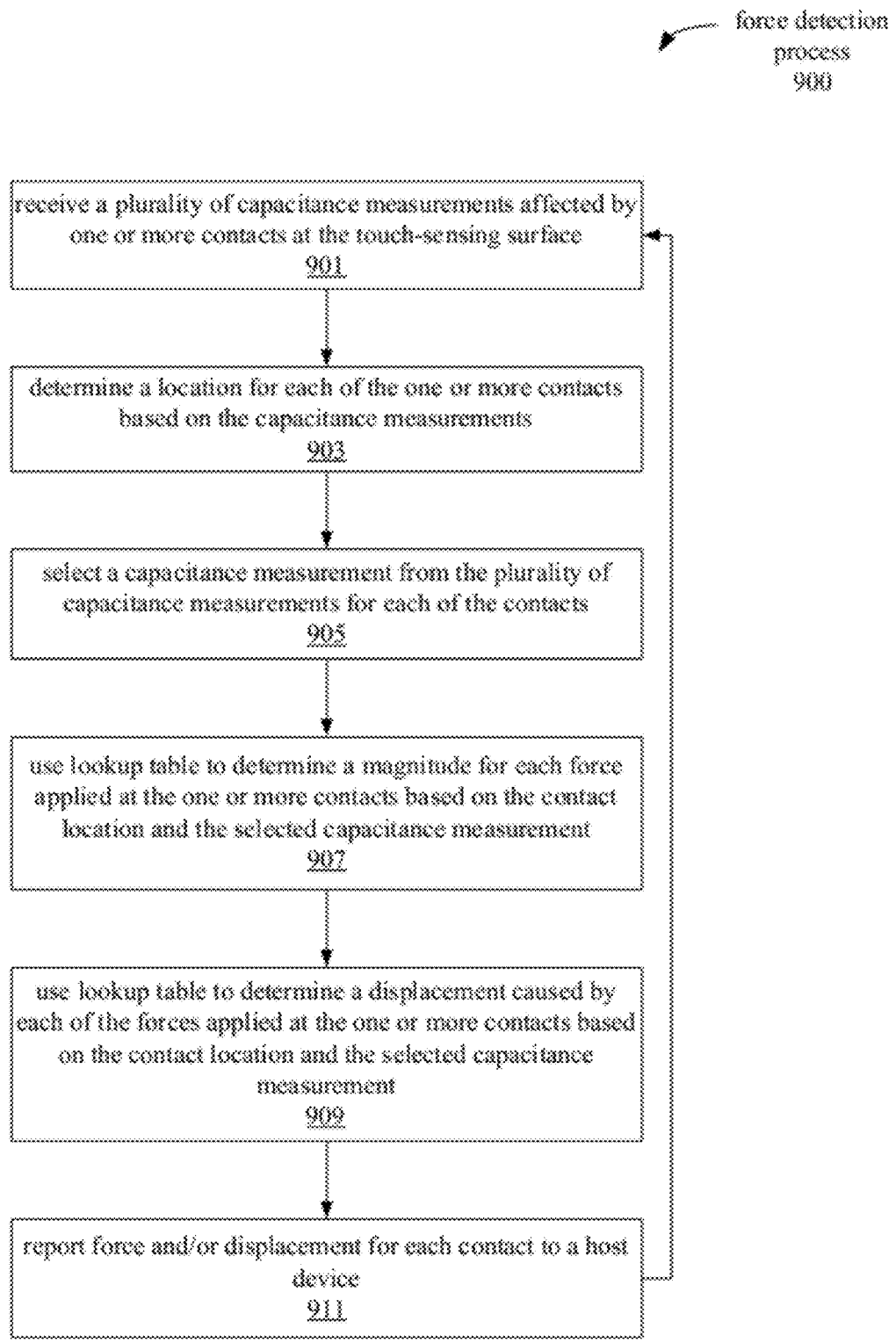
FIG. 9 is a flow diagram illustrating an embodiment of a force detection process.

FIG. 9 illustrates an embodiment of a force detection process 900 that may be implemented in a touch-sensing system, such as touch-sensing 100 of FIG. 1. In one embodiment, force detection process 900 begins at block 901. At block 901, the touch-sensing system may receive a plurality of capacitance measurements affected by one or more contacts at the touch-sensing surface. For example, with reference to FIG. 4, a contact 430 at the touch-sensing surface may cause changes in capacitances of sensor elements in the sensor array 401, resulting a set of capacitance values such as capacitance values B. A capacitance sensor of the touch-sensing system may measure these capacitances, which may then be received by processing logic. From block 901, the process 900 continues at block 903.

At block 903, the touch-sensing system determines a location for each of the one or more contacts based on the capacitance measurements received at block 901. For example, the magnitudes of capacitance values for the row and column sensor elements may be used to calculate a centroid location of a contact. From block 903, the process 900 continues at block 905.

At block 905, the touch-sensing system selects a capacitance measurement from the plurality of capacitance measurements for each of the contacts at the touch-sensing surface. In one embodiment, the capacitance value may be selected based on a ranking of the capacitance measurements in a capacitance profile. For example, the selected capacitance measurement may be a $P_4$ value, representing the fourth strongest capacitance signal from among the plurality of capacitance measurements in the profile. In alternative embodiments, the selected capacitance measurement may be selected based on a position relative to a peak capacitance measurement Cpeak. From block 905, the process 900 continues at block 907.

At block 907, the touch-sensing system may use a lookup table to determine a magnitude for each force applied at the one or more contacts based on the contact location and the selected capacitance measurement. For example, a lookup table such as 3D lookup table 600 may be used to correlate the location of a contact and a selected capacitance measurement, such as a $P_4$ value, of the contact with a force value. As previously described, the touch-sensing system may interpolate or extrapolate within a layer, such as a layer 601, or between layers to obtain a more accurate force value. From block 907, the process 900 continues at block 909.

At block 909, the touch-sensing system uses a lookup table to determine a displacement caused by each of the forces applied at the one or more contacts based on the contact location and the selected capacitance measurement. For example, a 3D lookup table such as table 600 may correlate a displacement value with the location of a contact and a selected capacitance measurement, such as a $P_4$ value. In one embodiment, the displacement values may be stored in the same 3D lookup table as force values of block 907. In one embodiment, the touch-sensing system may similarly perform interpolation or extrapolation within and between layers to more accurately determine a displacement value. From block 909, the process 900 continues at block 911.

At block 911, the touch-sensing system may report the force and/or displacement values associated with each contact to a host device. For example, with reference to FIG. 1, processing logic 102 of a touch-sensing system may report the location, force, and displacement values to a host 150. From block 911, the process 900 may continue back to block 901.

Thus, the touch-sensing system may repeat the operations associated with blocks 901 to 911 to continuously update and track the locations of contacts at the touch-sensing surface, the forces applied to the touch-sensing surface at the contacts, and the amounts of displacement of the touch-sensing surface at each contact.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, comprising:
receiving a first plurality of capacitance measurements that are measured from a plurality of sensor elements affected by a first contact at a touch-sensing surface that overlays a display panel;
wherein the touch-sensing surface is flexible and includes a flexible overlay, a flexible substrate, and the plurality of sensor elements, the plurality of sensor elements being positioned between the flexible substrate and the flexible overlay, the touch-sensing surface being configured to deflect more with respect to the display panel in proximity to the first contact than remotely from the first contact and thereby modify capacitances of a first subset of the plurality of displaced sensor elements proximate to the first contact;

selecting, from the first plurality of capacitance measurements, a first capacitance measurement corresponding to a first sensor element that is a predetermined distance from a second sensor element associated with a peak capacitance value, wherein the first sensor element and the second sensor element are within a same set of rows or columns separated by the predetermined distance;

determining a magnitude of a first force applied to the touch-sensing surface at a location of the first contact based on location coordinates, which correspond to the location of the first contact on the touch-sensing surface, and on the first capacitance measurement; and obtaining a corrected coordinate location for the first contact based on the magnitude of the first force.

2. The method of claim 1, further comprising determining the location coordinates of the first contact based on the plurality of capacitance measurements.

3. The method of claim 1, further comprising selecting the first capacitance measurement based on a ranking of a magnitude of the first capacitance measurement relative to magnitudes of other capacitance measurements from the first plurality of capacitance measurements.

4. The method of claim 3, wherein selecting the first capacitance measurement further comprises selecting a capacitance measurement having the fourth highest value among the first plurality of capacitance measurements as the first capacitance measurement.

5. The method of claim 1, wherein determining the magnitude of the first force further comprises looking up a force value indicating the magnitude of the first force in a lookup table, wherein the lookup table correlates the force value with the location of the first contact and the first capacitance measurement.

6. The method of claim 1, further comprising:
receiving a second plurality of capacitance measurements affected by a second contact at the touch-sensing surface; and
determining a magnitude of a second force applied to the touch-sensing surface at a location of a second contact based on location coordinates of the second contact and based on a second capacitance measurement of the second plurality of capacitance measurements, wherein the second force is applied simultaneously with the first force.

7. The method of claim 1, further comprising determining an amount of displacement of at least a portion of the touch-sensing surface caused by the first force.

8. The method of claim 7, wherein determining the amount of displacement comprises looking up from a lookup table a displacement value indicating the amount of displacement, wherein the lookup table correlates the displacement value with the location of the first contact and the first capacitance measurement.

9. An apparatus, comprising:
a capacitance sensor configured to measure a plurality of capacitance measurements from a plurality of sensor elements of a capacitive sensor array, wherein the plurality of capacitance measurements are affected by one or more contacts, including a first contact, at a touch-sensing surface that overlays a display panel;
wherein the touch-sensing surface is flexible and includes a flexible overlay, a flexible substrate, and the plurality of sensor elements of the capacitive sensor array, the plurality of sensor elements being positioned between the flexible substrate and the flexible overlay, the touch sensing surface being configured to deflect more with respect to the display panel in proximity to the first contact than remotely from the first contact and thereby modify capacitances of a first subset of the plurality of displaced sensor elements proximate to the first contact; and processing logic coupled with the capacitance sensor, wherein the processing logic is configured to:
select, from the plurality of capacitance measurements, a first capacitance measurement corresponding to a first sensor element that is a predetermined distance from a second sensor element associated with a peak capacitance value, wherein the first sensor element and the second sensor element are within a same set of rows or columns separated by the predetermined distance and the first capacitance measurement and the peak capacitance value correspond to the first contact;
determine location coordinates of each of the one or more contacts based on the plurality of capacitance measurements;
determine a magnitude of a force corresponding to the first contact applied at a location based on the location coordinates, which correspond to the location of each of the one or more contacts on the touch-sensing surface, and on the first capacitance measurement; and
obtain a corrected coordinate location for at least one of the one or more contacts based on the magnitude of the first force.

10. The apparatus of claim 9, wherein the processing logic is further configured to determine the magnitude of the force based on a magnitude of the at least one of the plurality of capacitance measurements.

11. The apparatus of claim 9, further comprising a lookup table configured to correlate each magnitude of force with a location of one of the one or more contacts and one of the plurality of capacitance measurements, wherein the processing logic is further configured to determine each magnitude of force by looking up in the lookup table a force value indicating each magnitude of force.

12. The apparatus of claim 9, wherein each of the one or more contacts comprises a contact between an object and the touch-sensing surface, and wherein the one or more contacts are simultaneous.

13. The apparatus of claim 9, further comprising a lookup table coupled with the processing unit, wherein the processing unit is further configured to determine an amount of displacement of at least a portion of the touch-sensing surface caused by each force applied to the touch-sensing surface by looking up from the lookup table a displacement value indicating the amount of the displacement.

14. An apparatus, comprising:
a capacitive sensor array comprising a plurality of sensor elements, wherein the capacitive sensor array is flexible and includes a flexible overlay and a flexible substrate, and wherein the plurality of sensor elements are positioned between the flexible substrate and the flexible overlay, the capacitive sensor array surface being configured to deflect more with respect to a display panel overlaid by the capacitive sensor array in proximity to a first contact than remotely from the first contact and thereby modify capacitances of a first subset of the plurality of displaced sensor elements proximate to the first contact;
a capacitance sensor coupled with the capacitive sensor array, wherein the capacitance sensor is configured to measure a plurality of capacitance measurements from the plurality of sensor elements affected by the first contact at a touch-sensing surface of the capacitive sensor array; and a processing logic coupled with the capacitance sensor, wherein the processing logic is configured to:

select, from the plurality of capacitance measurements, a first capacitance measurement corresponding to a first sensor element that is a predetermined distance from a second sensor element associated with a peak capacitance value, wherein the first sensor element and the second sensor element are within a same set of rows or columns separated by the predetermined distance;

determine a location of the first contact at the capacitive sensor array based on the plurality of capacitance measurements;

determine a magnitude of a first force applied to the capacitive sensor array at the location of the first contact based on location coordinates, which correspond to the location of the first contact on the capacitive sensor array, and on the first capacitance measurement of the plurality of capacitance measurements; and obtain a corrected coordinate location for the first contact based on the magnitude of the first force.

15. The apparatus of claim 14, wherein the processing logic is further configured to determine an amount of displacement, caused by the first force, of at least a portion of the touch-sensing surface of the capacitive sensor array.

16. The apparatus of claim 14, wherein the processing logic is further configured to determine the magnitude of the first force based on a magnitude of the at least one of the plurality of capacitance measurements.

17. The apparatus of claim 14, further comprising a lookup table coupled with the processing logic, wherein the lookup table is configured to correlate one of the plurality of capacitance measurements with a force value indicating the magnitude of the force, and wherein the processing logic is further configured to determine the magnitude of the force by looking up the force value.

18. The apparatus of claim 14, wherein the processing logic is further configured to determine a magnitude of a second force applied at a second contact location at the touch-sensing surface based on the plurality of capacitance measurements, wherein the second force is applied simultaneously with the first force.

19. The apparatus of claim 14, further comprising a lookup table coupled with the processing logic, wherein the lookup table is configured to correlate one of the plurality of capacitance measurements with a displacement value, and wherein the processing logic is further configured to determine an amount of displacement, caused by the force, of at least a portion of a touch-sensing surface of the capacitive sensor array by looking up the displacement value from the lookup table.

* * * * *